(12) United States Patent
Zhang et al.

(10) Patent No.: US 9,379,792 B2
(45) Date of Patent: Jun. 28, 2016

(54) METHOD FOR FEEDING BACK CHANNEL STATE INFORMATION, METHOD FOR TRANSMITTING CHANNEL STATE INFORMATION REFERENCE SIGNAL, UE AND BASE STATION

(71) Applicant: FUJITSU LIMITED, Kawasaki-shi, Kanagawa (JP)

(72) Inventors: Jian Zhang, Beijing (CN); Yi Zhang, Beijing (CN); Yi Wang, Beijing (CN); Hongchao Li, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/797,342

(22) Filed: Jul. 13, 2015

(65) Prior Publication Data

US 2015/0318909 A1  Nov. 5, 2015

Related U.S. Application Data

(63) Continuation of application No. PCT/CN2013/071030, filed on Jan. 28, 2013.

(51) Int. Cl.
*H04L 1/02* (2006.01)
*H04B 7/04* (2006.01)
(Continued)

(52) U.S. Cl.
CPC ............ *H04B 7/0413* (2013.01); *H04B 7/0456* (2013.01); *H04B 7/0617* (2013.01); *H04B 7/0626* (2013.01); *H04W 88/08* (2013.01)

(58) Field of Classification Search
CPC .... H04B 7/0417; H04B 7/0456; H04B 7/046; H04W 72/10; H04W 24/10; H04L 1/0618; H04L 1/06
USPC .......... 375/267, 299, 347, 349; 370/252, 328, 370/329; 455/214, 337
See application file for complete search history.

(56) References Cited

U.S. PATENT DOCUMENTS 9,119,209 B2 *  8/2015  Nam .................... H04W 72/046
2013/0064317 A1  3/2013  Tong et al.
(Continued)

FOREIGN PATENT DOCUMENTS

CN  101877865 A  11/2010
CN  102195755 A  9/2011
(Continued)

OTHER PUBLICATIONS

International Preliminary Report on Patentability with Written Opinion of the International Searching Authority for corresponding International Patent Application No. PCT/CN2013/071030 mailed on Aug. 6, 2015 with English translation.
(Continued)

*Primary Examiner* — Khai Tran
(74) *Attorney, Agent, or Firm* — Myers Wolin, LLC

(57) ABSTRACT

A method for feeding back CSI, a method for transmitting CSI-RS, UE and a base station. The method for feeding back includes: feeding back respectively, by UE, CSI corresponding to the vertical dimension and CSI corresponding to the horizontal dimension. Thereby, overhead for performing feedback of CSI in a 3D MIMNO system, or overhead for transmitting CSI-RS, may be further reduced.

14 Claims, 10 Drawing Sheets

601 feeding back respectively CSI corresponding to the vertical dimension and CSI corresponding to the horizontal dimension of the first codebook, and feeding back respectively CSI corresponding to the vertical dimension and CSI corresponding to the horizontal dimension of the second codebook, by the UE

(51) Int. Cl.
*H04B 7/06* (2006.01)
*H04W 88/08* (2009.01)

(56) References Cited

U.S. PATENT DOCUMENTS

| | | |
|---|---|---|
| 2013/0114763 A1 | 5/2013 | Park |
| 2013/0267222 A1 | 10/2013 | Park et al. |
| 2013/0308714 A1* | 11/2013 | Xu ................. H04B 7/0417 375/267 |
| 2014/0341065 A1* | 11/2014 | Liao ................. H04L 1/0026 370/252 |

FOREIGN PATENT DOCUMENTS

| | | |
|---|---|---|
| WO | 2011/110064 A1 | 9/2011 |
| WO | 2012/005476 A2 | 1/2012 |
| WO | 2012/077930 A2 | 6/2012 |

OTHER PUBLICATIONS

International Search Report issued for corresponding International Patent Application No. PCT/CN2013/071030, mailed Oct. 31, 2013, with an English translation.

Notice of preliminary rejection issued for corresponding Korean Patent Application No. 10-2015-7020374 mailed on May 11, 2016 with an English translation.

* cited by examiner

201 feeding back respectively, by UE, CSI corresponding to the vertical dimension and CSI corresponding to the horizontal dimension

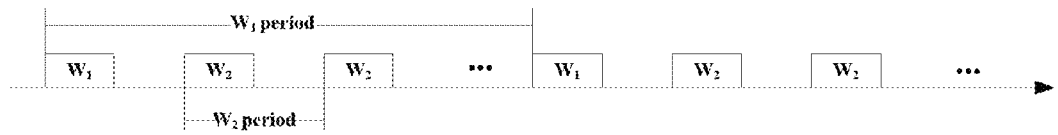
Fig. 5
601
feeding back respectively CSI corresponding to the vertical dimension and CSI corresponding to the horizontal dimension of the first codebook, and feeding back respectively CSI corresponding to the vertical dimension and CSI corresponding to the horizontal dimension of the second codebook, by the UE
Fig. 6
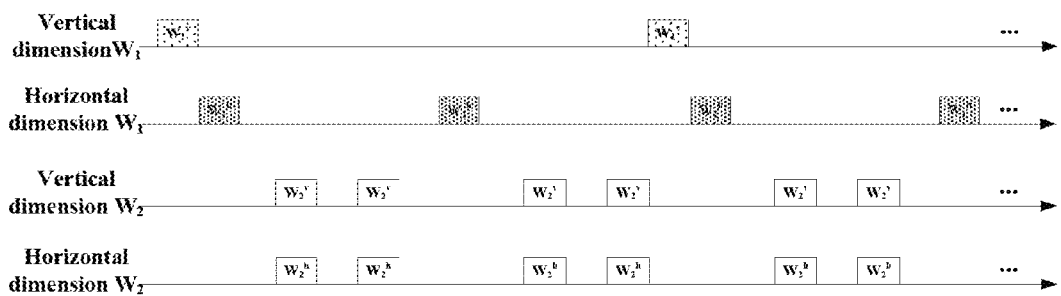
Fig. 7

1401 transmitting, by a base station, a CSI-RS by using any row of antenna array elements and any column of antenna array elements in the 2D antenna array

Fig. 14

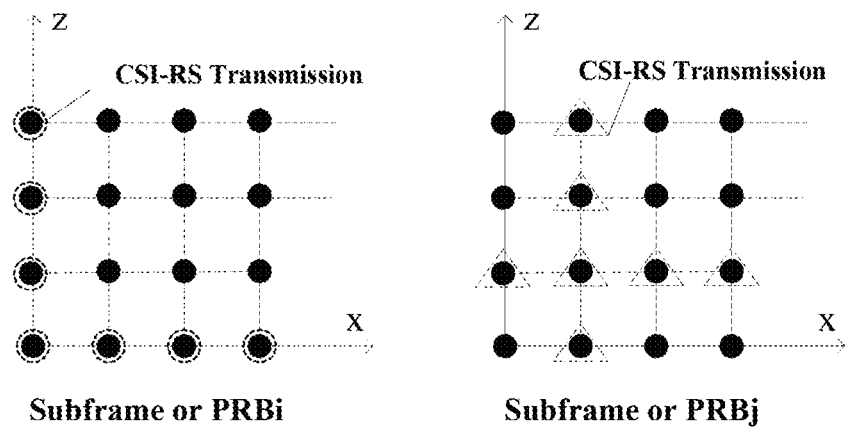

Subframe or PRBi      Subframe or PRBj

Fig. 15

1601 receiving, by UE, a CSI-RS transmitted by a base station, the CSI-RS being transmitted by the base station by using any row of antenna array elements and any column of antenna array elements in the 2D antenna array

Fig. 16

METHOD FOR FEEDING BACK CHANNEL STATE INFORMATION, METHOD FOR TRANSMITTING CHANNEL STATE INFORMATION REFERENCE SIGNAL, UE AND BASE STATION

CROSS REFERENCE TO RELATED APPLICATIONS

This application is a continuation application of International Application PCT/CN2013/071030 filed on Jan. 28, 2013, the entire contents of which are incorporated herein by reference.

TECHNICAL FIELD

The present disclosure relates to the field of communications, and in particular to a method for feeding back channel state information, a method for transmitting a channel state information reference signal (CSI-RS), UE and a base station.

BACKGROUND

The MIMO (multiple input multiple output) technology is one of important contents in LTE-A standardization, in which adaptive adjustment in a direction of a beam can be achieved by using multiple antennas, thereby achieving a goal of increasing user signal to interference plus noise ratio or interference coordination. A main gain of the MIMO is originated from grasp of channel state information (CSI) by a base station side, channel information being obtained by CSI feedback of the user, and the CSI feedback being based on a predefined codebook.

As the continuous increase of demands for data rates, a future MIMO technology shall be developed in a direction of full-space 3D beamforming/precoding. The 3D MIMO precoding enables a beam to be adjusted in a vertical dimension, which increases a resolution of the beam, and is able to align the user or avoid interference more efficiently.

However, it was found by the inventors that in an existing solution, increase of overhead of CSI feedback and reference signal brought by the 3D MIMO system often becomes a bottleneck of its performance increase, if it is not optimally designed, the performance of 3D MIMO precoding will be greatly constrained.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Embodiments of the present disclosure provide a method for feeding back CSI, a method for transmitting a CSI-RS, UE and a base station, with a target of further reducing overhead for performing CSI feedback or overhead for transmitting reference signals for CSI feedback for a 3D MIMO system.

According to an aspect of the embodiments of the present disclosure, there is provided a method for feeding back CSI, applicable to an MIMO system using a 2D antenna array including a vertical dimension and a horizontal dimension, the method including:

feeding back respectively, by UE, CSI corresponding to the vertical dimension and CSI corresponding to the horizontal dimension.

According to another aspect of the embodiments of the present disclosure, there is provided a method for feeding back CSI, applicable to an MIMO system using a 2D antenna array including a vertical dimension and a horizontal dimension, the method including:

configuring independently, by a base station, information of the vertical dimension and the horizontal dimension; and receiving CSI corresponding to the vertical dimension and CSI corresponding to the horizontal dimension fed back respectively by UE according to the configured information.

According to a further aspect of the embodiments of the present disclosure, there is provided UE, applicable to an MIMO system using a 2D antenna array including a vertical dimension and a horizontal dimension, the UE including:

a feedback unit configured to feed back respectively CSI corresponding to the vertical dimension and CSI corresponding to the horizontal dimension.

According to still another aspect of the embodiments of the present disclosure, there is provided a base station, applicable to an MIMO system using a 2D antenna array including a vertical dimension and a horizontal dimension, the base station including:

a configuring unit configured to configure independently information of the vertical dimension and the horizontal dimension; and a receiving unit configured to receive CSI corresponding to the vertical dimension and CSI corresponding to the horizontal dimension fed back by UE according to the configured information.

According to still another aspect of the embodiments of the present disclosure, there is provided a method for transmitting CSI-RS, applicable to an MIMO system using a 2D antenna array, the method including:

transmitting, by a base station, a CSI-RS by using any row of antenna array elements and any column of antenna array elements in the 2D antenna array.

According to still another aspect of the embodiments of the present disclosure, there is provided a method for transmitting a CSI-RS, applicable to an MIMO system using a 2D antenna array, the method including:

receiving, by UE, a CSI-RS transmitted by a base station, the CSI-RS being transmitted by the base station by using any row of antenna array elements and any column of antenna array elements in the 2D antenna array.

According to still another aspect of the embodiments of the present disclosure, there is provided a base station, applicable to an MIMO system using a 2D antenna array, the base station including:

a transmitting unit configured to transmit a CSI-RS by using any row of antenna array elements and any column of antenna array elements in the 2D antenna array.

According to still another aspect of the embodiments of the present disclosure, there is provided UE, applicable to an MIMO system using a 2D antenna array, the UE including:

a receiving unit configured to receive a CSI-RS transmitted by a base station, the CSI-RS being transmitted by the base station by using any row of antenna array elements and any column of antenna array elements in the 2D antenna array.

According to still another aspect of the embodiments of the present disclosure, there is provided a communication system, including the UE as described above and the base station as described above.

According to still another aspect of the embodiments of the present disclosure, there is provided a computer-readable program, wherein when the program is executed in a base station, the program enables a computer to carry out the method for feeding back CSI as described above, or the method for transmitting CSI-RS as described above, in the base station.

According to still another aspect of the embodiments of the present disclosure, there is provided a storage medium in which a computer-readable program is stored, wherein the computer-readable program enables a computer to carry out the method for feeding back CSI as described above, or the method for transmitting CSI-RS as described above, in a base station.

According to still another aspect of the embodiments of the present disclosure, there is provided a computer-readable program, wherein when the program is executed in UE, the program enables a computer to carry out the method for feeding back CSI as described above, or the method for transmitting CSI-RS as described above, in the UE.

According to still another aspect of the embodiments of the present disclosure, there is provided a storage medium in which a computer-readable program is stored, wherein the computer-readable program enables a computer to carry out the method for feeding back CSI as described above, or the method for transmitting CSI-RS as described above, in UE.

An advantage of the embodiments of the present disclosure exists in that the UE respectively feeds back CSI corresponding to the vertical dimension and CSI corresponding to the horizontal dimension, thereby overhead for performing CSI feedback may be further reduced.

Furthermore, the base station transmits a CSI-RS by using any row of antenna array elements and any column of antenna array elements in the 2D antenna array, thereby overhead for transmitting CSI-RS may be further reduced.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced in size.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 5 is a schematic diagram of a feedback period of a dual codebook of an embodiment of the present disclosure;

FIG. 6 is a flowchart of a method for feeding back of Embodiment 2 of the present disclosure;

FIG. 7 is another schematic diagram of a feedback period of a dual codebook of an embodiment of the present disclosure;

FIG. 14 is a flowchart of a method for transmitting of Embodiment 7 of the present disclosure;

FIG. 15 is a schematic diagram of an example of CSI-RS transmission of Embodiment 7 of the present disclosure;

FIG. 16 is a flowchart of a method for transmitting of Embodiment 8 of the present disclosure;

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

As the continuous increase of demands for data rates, a future MIMO technology shall be developed in a direction of full-space 3D beamforming/precoding. And in Rel. 8 MIMO and enhancement to MIMO in subsequent releases Rel. 10 and Rel. 11, such as an 8-port MIMO dual codebook, beamforming can only be performed in a horizontal dimension.

Figures 1, 2:
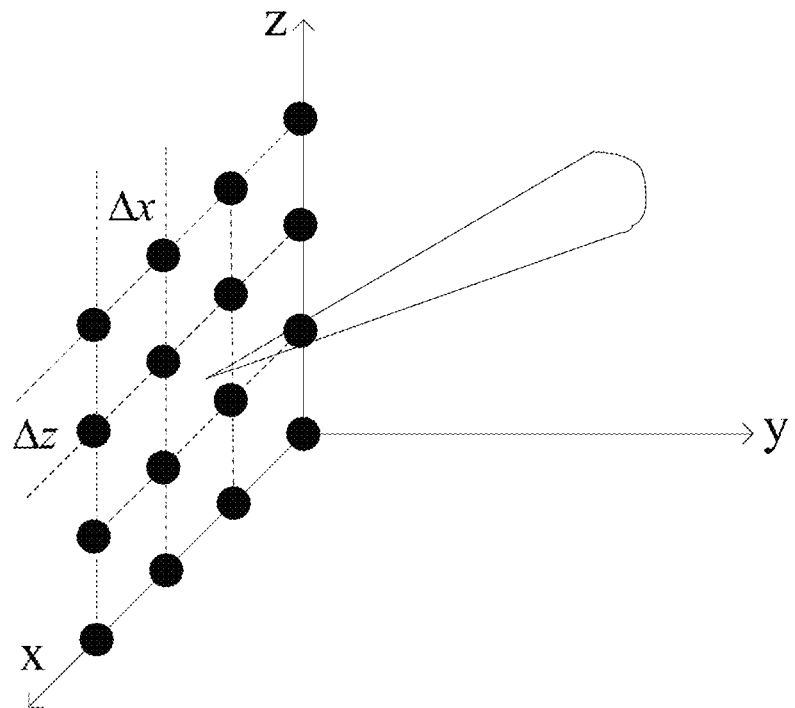
FIG. 1 is a schematic diagram of 3D MIMO precoding of an embodiment of the present disclosure.
FIG. 2 is a flowchart of a method for feeding back of Embodiment 1 of the present disclosure.

In comparison with a uniform linear antenna array, 3D MIMO precoding usually needs to use a 2D antenna array. FIG. 1 is a schematic diagram of 3D MIMO precoding. As shown in FIG. 1, a rectangular planar array may be placed in an xoz plane, which may make a main lobe directed to a certain direction in the 3D space, since there exist array elements in a vertical direction.

A 2D codebook is mainly based on antenna array design optimization, and for 3D MIMO precoding, its codebook structure needs to be matched with characteristics of 2D antenna array. As a planar array response may be uniquely determined by a horizontal dimension antenna array response and a vertical dimension antenna array response, a codebook design may start from a point of view of matching with an antenna array response, and use two discrete Fourier transform (DFT) vectors to quantize the horizontal dimension and the vertical dimension, respectively.

UE feeds back indexes of the two DFT vectors in the codebook, that is, simultaneously feeding back precoding matrix index (PMI) information of the horizontal dimension and the vertical dimension, and a base station may generate a precoding matrix of the whole planar antenna array based on the fed back two DFT vectors. In comparison with a conventional case where the MIMO precoding feeds back a PMI of one dimension only, such CSI feedback containing PMI of two dimensions increases feedback overhead. How to reduce overhead for CSI feedback or transmission shall be described below in details.

Embodiment 1

An embodiment of the present disclosure provides a method for feeding back CSI, applicable to an MIMO system using a 2D antenna array including a vertical dimension and a horizontal dimension. This method shall be described in this embodiment from a UE side.

FIG. 2 is a flowchart of the method for feeding back of the embodiment of the present disclosure. As shown in FIG. 2, the method includes:

step 201: feeding back respectively, by UE, CSI corresponding to the vertical dimension and CSI corresponding to the horizontal dimension.

In this embodiment, related feedback parameters of the vertical dimension and the horizontal dimension may be configured independently. For example, different feedback periods or feedback offsets of the CSI may be configured. The relevant art may be referred to for detailed definition of a feedback period and a feedback offset of the CSI.

In particular implementation, the feedback period of the CSI of the vertical dimension may be different from the feedback period of the CSI of the horizontal dimension. For example, the feedback period of the CSI of the vertical dimension is longer than the feedback period of the CSI of the horizontal dimension. If a vertical dimension response of an array changes slower than a horizontal dimension response does, UE may feed back the vertical dimension response in a longer period, with no need to contain two pieces of CSI (such as PMI) in each time of feedback; however, the present disclosure is not limited thereto, in some scenarios for example, the feedback period of the CSI of the vertical dimension is shorter than the feedback period of the CSI of the horizontal dimension, and a particular implementation may be determined according to an actual situation.

In particular implementation, the feedback offset of the CSI of the vertical dimension may be different from the feedback offset of the CSI of the horizontal dimension. For example, the feedback offset of the CSI of the vertical dimension may be less than the feedback offset of the CSI of the horizontal dimension, and a particular implementation may be determined according to an actual situation.

Figure 3:
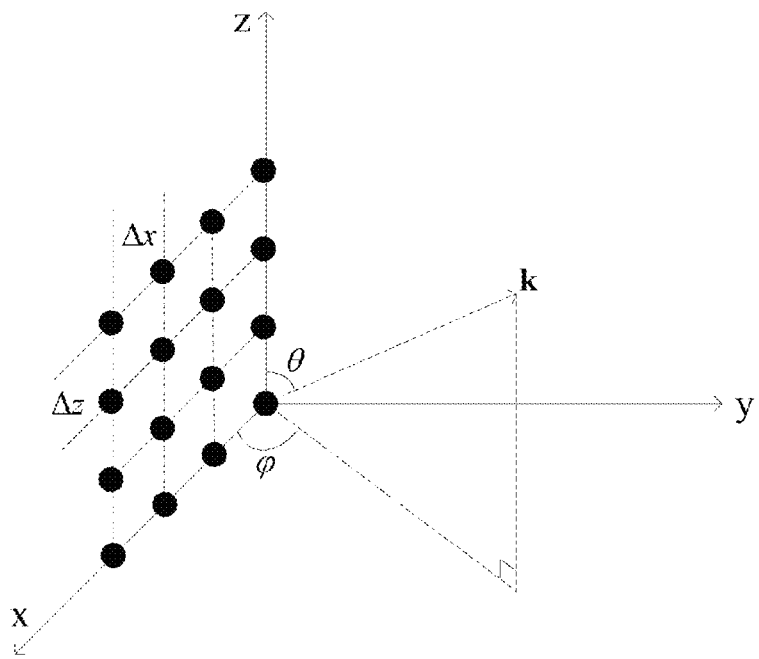
FIG. 3 is a schematic diagram of a 2D antenna array response of an embodiment of the present disclosure.

FIG. 3 is a schematic diagram of a 2D antenna array response of an embodiment of the present disclosure. As shown in FIG. 3, the horizontal plane is the xoy plane, the vertical direction follows the z axis direction, the antenna array is located in the xoz plane, N array elements are arranged in the horizontal direction, with an array element space being Δx, and M array elements are arranged in the vertical direction, with an array element space being Δz. Hence, position vectors of the array elements may be expressed as: r=(nΔT, 0, mΔz); where, n=0, 1, ..., N−1, m=0, 1, ... M−1. A vector k is mainly used to characterize a propagation direction of a surface wave, an included angle between it and the z axis is θ, an included angle between its horizontal projection and the x axis is φ, and it is expressed in Cartesian coordinates as $$k = \frac{2\pi}{\lambda}(\sin\theta\cos\varphi, \sin\theta\sin\varphi, \cos\theta),$$

where, λ denotes a wavelength.

For a certain array element, its antennal response is given by the following equation:

$$e^{j\langle k,r\rangle} = e^{j\frac{2\pi}{\lambda}(n\Delta x\sin\theta\cos\varphi + m\Delta z\cos\theta)};$$

it is defined that $$h = \frac{2\pi}{\lambda}\Delta x\sin\theta\cos\varphi, \quad v = \frac{2\pi}{\lambda}\Delta z\cos\theta,$$

and the array element response may be simplified as:

$$e^{j\langle k,r\rangle} = e^{j(nh+mv)}.$$

And responses of the whole antenna array may be written into a form of a matrix as below:

$$\begin{bmatrix} e^{j(M-1)v} & e^{j(M-1)v}e^{jh} & e^{j(M-1)v}e^{j2h} & \cdots & e^{j(M-1)v}e^{j(N-1)h} \\ \vdots & \vdots & \vdots & \vdots & \vdots \\ e^{j2v} & e^{j2v}e^{jh} & e^{j2v}e^{j2h} & \cdots & e^{j2v}e^{j(N-1)h} \\ e^{jv} & e^{jv}e^{jh} & e^{jv}e^{j2h} & \cdots & e^{jv}e^{j(N-1)h} \\ 1 & e^{jh} & e^{j2h} & \cdots & e^{j(N-1)h} \end{bmatrix}. \quad (1)$$

An ideal rectangular array response has a characteristic as follows: any two row vectors differ from each other by only a constant coefficient, and hence, all the row vectors have the same direction; likewise, all the column vectors have the same direction. Therefore, all the array responses may be recovered by obtaining respective vector information of one row and one column only, and hence obtaining a precoding matrix matched with a channel.

As the number of array elements of a 2D array is relatively large, and antenna array arrangement of a small space is often obtained due to limitation of an array size, a design principle of an 8-antenna codebook may be followed for a horizontal dimension or vertical dimension response, in which a DFT vector is used to quantize it, and accordingly, the UE feeds back PMI information of the horizontal dimension or the vertical dimension.

In this embodiment, the method may further include: configuring independently a spatial domain oversampling coefficient of DFT vectors of the vertical dimension and a spatial domain oversampling coefficient of DFT vectors of the horizontal dimension. For example, the oversampling coefficient of the vertical dimension is less than or equal to the oversampling coefficient of the horizontal dimension.

In particular implementation, it is assumed that a DFT vector of a length of $n_h$ is used for the horizontal dimension of the array (array elements in a row direction), and a DFT vector of a length of $n_v$ is used for the vertical dimension of the array (array elements in a column direction). Here, a ratio of the DFT length to the number of array elements in the direction determines the spatial domain oversampling coefficient. For example, for a case of an 8 antennas, a DFT vector of a length of 32 is used for 4 antennas of the same polarization direction, that is, an oversampling coefficient of 8, and the oversampling may further increase the spatial domain resolution.

As the UE may possess different distribution features in the horizontal direction and the vertical direction, it may be taken into account that different oversampling ratios may be used for the vertical dimension and the horizontal dimension, such as configuring that the oversampling coefficient of the vertical dimension is less than or equal to that of the horizontal dimension.

In this embodiment, the method may further include: the number of the DFT vectors of the vertical dimension is less than a length of the DFT.

In particular implementation, the used number of the DFT vectors is often let to be equal to the length of the DFT, so as to obtain an omnidirectional coverage for the spatial domain. This is necessary to the horizontal dimension in achieving a seamless coverage; however, for the vertical dimension, taking an actual UE distribution into account, it is possible that an omnidirectional coverage is not needed by the vertical dimension, and hence, it may be considered to reduce the number of available DFT vectors, so that it is less than the length of the DFT.

It can be seen from Expression (1) that the essence of the quantization of the array element response of the vertical dimension of the array is to quantize a phase difference $$v = \frac{2\pi}{\lambda} \Delta z \cos\theta$$

of neighboring array elements; wherein a change of $\theta$ results in a change of the phase v. Likewise, it can be obtained from Expression (1) that the quantization of the array element response of the horizontal dimension of the array is actually to quantize a phase difference $$h = \frac{2\pi}{\lambda} \Delta x \sin\theta \cos\varphi;$$

wherein h is dependent on $\theta$ and $\varphi$.

In this embodiment, as the movement of the UE often occurs in the horizontal direction, variation of the included angle $\theta$ between it and the z axis is slower than that of the horizontal azimuth angle $\varphi$, and correspondingly, the variation of the phase v is slower than the variation of the phase h. Based on a result that the change of the array element response in the vertical direction is less intense than the change of the array element response in the horizontal direction, a feedback period longer than that of the horizontal dimension PMI ($W^h$) feedback may be configured for the vertical dimension PMI ($W^v$) feedback in the CSI feedback.

Figure 4:
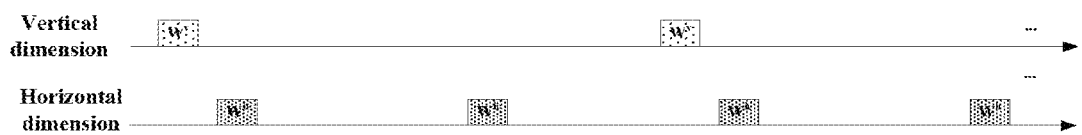
FIG. 4 is a schematic diagram of PMI feedback of an embodiment of the present disclosure.

FIG. 4 is a schematic diagram of PMI feedback of an embodiment of the present disclosure, in which only a PMI component is shown, and rank index (RI)/channel quality indicator (CQI) components are omitted.

As shown in FIG. 4, for the PMI feedback, a subframe occupied by it is jointly determined by two parameters, an offset and a period; and for vertical dimension and horizontal dimension PMIs, their respective offsets and periods may be configured independently. It should be noted that the present disclosure is only illustrated in FIG. 4; however, the present disclosure is not limited thereto.

It can be seen from the above embodiment that the UE respectively feeds back the CSI corresponding to the vertical dimension and the CSI corresponding to the horizontal dimension, which may further reduce the overhead for performing feedback of CSI.

Embodiment 2

On the basis of Embodiment 1, this embodiment describes a dual codebook in detail, with contents identical to those in Embodiment 1 being not going to be described any further.

In existing standards, MIMO downlink transmission with numbers of antenna ports being 2, 4 and 8 is supported, and the used antennal array is mainly a uniform linear antenna array. Taking an MIMO system with 8 antenna ports as an example, a major optimization scenario of its codebook is a cross-polarized antenna array with small spaces, in which DFT vectors are used to quantize identical polarization directions, and a dual-codebook structure is employed. Taking rank 1 transmission as an example, its dual codebook $W_1, W_2$ may be obtained by using the following formulae:

$$B = [b_0 \ b_1 \ \ldots \ b_{31}],$$

$$[B]_{1+m,1+n} = e^{j\frac{2\pi mn}{32}}, m = 0, 1, 2, 3, n = 0, 1, \ldots, 31$$

$$X^{(k)} \in \{[b_{2k \bmod 32} \ b_{(2k+1) \bmod 32} \ b_{(2k+2) \bmod 32} \ b_{(2k+3) \bmod 32}]: k = 0, 1, \ldots, 15\}$$

$$W_1^{(k)} = \begin{bmatrix} X^{(k)} & 0 \\ 0 & X^{(k)} \end{bmatrix}$$

$$W_1 \in C_1 = \{W_1^{(0)}, W_1^{(1)}, W_1^{(2)}, \ldots, W_1^{(15)}\}$$

$$W_2 \in C_2 = \left\{\frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix}\right\};$$

$$Y \in \{\tilde{e}_1, \tilde{e}_2, \tilde{e}_3, \tilde{e}_4\}$$

where, B is a truncated matrix with 4 rows and 32 columns, each column forming a beam, $X^{(k)}$ is an element in the set $\{X^{(0)}, X^{(1)}, \ldots, X^{(15)}\}$, which is used to divide the 32 beams into 16 groups in forms of, for examples, $\{b_2,b_3,b_4,b_5\}, \ldots, \{b_{28},b_{29},b_{30},b_{31}\}, \{b_{30},b_{31},b_0,b_1\}$, neighboring groups having overlapped beams, $W_1$ is used to determine a beam set $X^{(k)}$ of a small range for beam selection of coarse granularities, and $W_2$ is used to more finely select beams in a range of a selected beam set; and precoding vectors finally used for rank 1 transmission are:

$$W = W_1 W_2 = \frac{1}{\sqrt{2}} \begin{bmatrix} X^{(k)} & Y \\ \rho X^{(k)} & Y \end{bmatrix}; \quad \rho \in \{1, -1, j, -j\}$$

in the above formula, the upper half of the block matrix characterizes the same polarization direction, the lower half characterizes the other polarization direction, ρ adjusts phase relations between different polarized antennas, and $W_2$ multiplication is actually to perform column selection on $X^{(k)}$, that is, more finely selecting beams in a range of several obtained beams. A physical meaning of the above operations may be summarized as: adjusting beams generated in different polarization directions to be aligned with the direction of the UE, and then obtaining in-phase combination between the different polarization directions by phase adjustment.

In the design of the dual codebook, it is actually that effects of the CSI feedback are comprehensively considered. In the above dual codebook structure, $W_1$ often characterizes a long-term/wideband feature, and $W_2$ characterizes a short-term/sub-band feature. According to such a feature of $W_1$, $W_2$, in periodic CSI feedback, a feedback period longer than that of $W_2$ is configured for $W_1$. For example, for a sub-model 1 of a CSI feedback model 1-1 in existing standard, the feedback period of $W_2$ is $N_{pd}$, and the feedback period of $W_1$ is $M_{RI}$ times of $N_{pd}$; and for a case of PTI=0 in a CSI feedback model 2-1, the feedback period of $W_2$ is $N_{pd}$, and the feedback period of $W_1$ is H' times of $N_{pd}$.

FIG. 5 is a schematic diagram of a feedback period of a dual codebook, showing feedback periods of $W_1$, $W_2$. As shown in FIG. 5, the feedback period of $W_1$ may be longer than the feedback period of $W_2$.

In this embodiment, in an MIMO system using a 2D antenna array, a dual codebook including a first codebook and a second codebook may be employed, and the UE may perform the CSI feedback according to the dual codebook.

FIG. 6 is a flowchart of a method for feeding back of an embodiment of the present disclosure. As shown in FIG. 2, the method includes:

step 601: feeding back respectively CSI corresponding to the vertical dimension and CSI corresponding to the horizontal dimension of the first codebook, and feeding back respectively CSI corresponding to the vertical dimension and CSI corresponding to the horizontal dimension of the second codebook, by the UE.

In this embodiment, in feeding back the selected DFT vectors, the 8-antenna MIMO may use a dual codebook structure. In 3D MIMO precoding, the PMI feedback of the vertical dimension and the horizontal dimension may also use a dual codebook. In combination with long-term/short-term PMI feedback of the dual codebook, slow variation feature of the vertical dimension may be utilized between saving feedback overhead and guaranteeing precoding performance to achieve better tradeoff.

The structure of the dual codebook shall be described below taking rank 1 as an example. It is assumed that the number of the DFT vectors for use by the vertical dimension is $N_v$, a DFT vector set is expressed as $B_v = [b_0^v \, b_1^v \ldots b_{N_v-1}^v]$; and likewise, a DFT vector set used by the horizontal dimension is expressed as $B_h = [b_0^h \, b_1^h \ldots b_{N_v-1}^h]$. The vectors in $B_v$ are divided into $G_v$ overlapped subsets, then a vertical dimension long-term precoding matrix is $W_1^v \in \{X_0^v, X_1^v, \ldots X_{G_v-1}^v\}$; where, each $X_k^v$ contains the same number $E_v$ of DFT vectors, the DFT vectors being taken from the set $B_v$, different subsets $X_k^v$ contain common DFT vectors, and $W_1^v$ is a $M \times E_v$-dimensional matrix.

Likewise, a horizontal dimension long-term precoding matrix is $W_1^h \in \{X_0^h, X_1^h, \ldots, X_{G_h-1}^h\}$, which is a $N \times E_h$-dimensional matrix. For the case of rank 1, a vertical dimension short-term precoding matrix is $W_2^v \in \{\tilde{e}_1, \tilde{e}_2, \tilde{e}_3, \tilde{e}_{E_v}\}$; is $E_v \times 1$-dimensional vectors, in which the i-th element being 1, and other elements being 0. Likewise, a horizontal dimension short-term precoding matrix is $W_2^h \in \{\tilde{e}_1, \tilde{e}_2, \tilde{e}_3, \tilde{e}_{E_v}\}$, which is a $E_h \times 1$-dimensional matrix.

The fed back vertical dimension dual codebook uniquely determines the DFT vectors of the vertical dimension, which are denoted by $f^v = W_1^v W_2^v$; and likewise, the DFT vectors of the horizontal dimension are denoted by $f^h = W_1^h W_2^h$. Under a condition that $f^v, f^h$ are known, a PMI matrix $W = g(f^v, f^h) = g(W_1^v W_2^v, W_1^h W_2^h)$ of complete rectangular array may be regenerated; wherein a function g(.,.) is generated which is in a form of, for example, $g(a,b) = [a \, a \ldots a]_{M \times N} \odot [b; b; \ldots b]_{M \times N}$, a product of two block matrices being a Hadamard product.

Under the dual codebook structure, the UE needs to feed back respective $W_1$, $W_2$ information of the vertical dimension and the horizontal dimension, and no matter it is $W_1$ feedback or $W_2$ feedback, a PMI feedback offset and period may be independently configured for the vertical dimension and the horizontal dimension.

In an implementation, for the first codebook, the CSI feedback period of the vertical dimension may be different from that of the horizontal dimension; and for the second codebook, the CSI feedback period of the vertical dimension may be identical to that of the horizontal dimension.

In particular implementation, for the first codebook, the CSI feedback period of the vertical dimension may be longer than that of the horizontal dimension, and the CSI feedback offset of the vertical dimension may be different from that of the horizontal dimension.

FIG. 7 is a schematic diagram of a feedback period of a dual codebook of an embodiment of the present disclosure. As shown in FIG. 7, for the $W_1$ feedback, the vertical dimension uses a feedback period longer than that of the horizontal dimension, and the feedback offset of the vertical dimension is different from that of the horizontal dimension; and for the $W_2$ feedback, the vertical dimension may use a feedback period and offset identical to those of the horizontal dimension.

As the variation of the vertical dimension is slow, it will not immediately get out of the range of the long-term feature $W_1^v$ even if the change occurs. Thus, $W_1^v$ may be sustained unchanged in a relatively long period of time, while the fed back $W_2^v$ may still be finely selected and adjusted within $W_1^v$. Therefore, the performance may be ensured to a maximum extent while saving feedback overhead.

In another implementation, for the first codebook, the CSI feedback period of the vertical dimension may be different from that of the horizontal dimension; and for the second codebook, the CSI feedback period of the vertical dimension may also be different from that of the horizontal dimension. The saving feedback overhead lies in that the $W_2$ feedback in the vertical dimension is configured with a longer feedback period.

It should be noted that the above implementations are illustrative only; however, the present disclosure is not limited thereto, and a particular implementation may be determined according to an actual situation.

In this embodiment, the 2D antenna array may be configured with dual-polarized antennas, and the method may further include: feeding back information containing adjustment of a phase between polarization directions by the UE.

Figure 8:
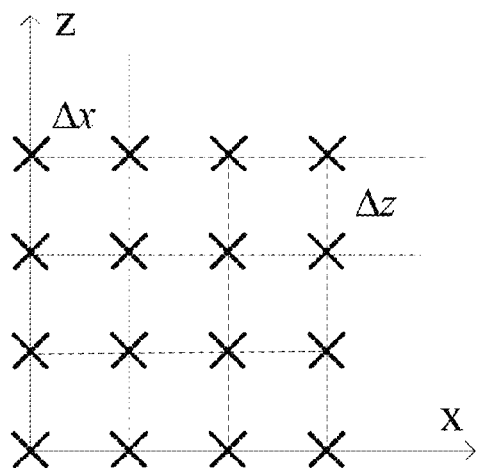
FIG. 8 is a schematic diagram of a dual-polarized antenna array of an embodiment of the present disclosure.

FIG. 8 is a schematic diagram of a dual-polarized antenna array of an embodiment of the present disclosure. For a case where a rectangular array is configured with dual-polarized antennas, as shown in FIG. 8, it is still arranged in the form of M row and N columns, but the total number of the array elements is increased from M·N of the original polarization of the same direction to 2M·N.

Figure 9:
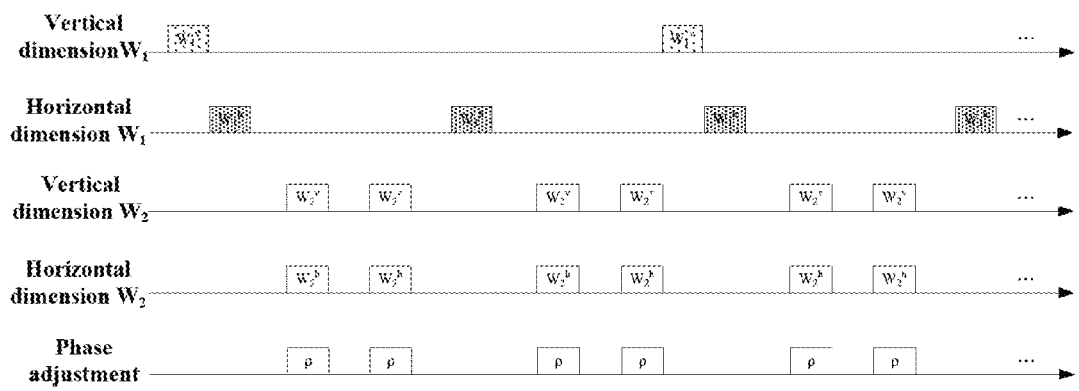
FIG. 9 is a schematic diagram of an example of CSI feedback in a dual-polarized antenna array of an embodiment of the present disclosure.

FIG. 9 is a schematic diagram of an example of CSI feedback in a dual-polarized antenna array of an embodiment of the present disclosure, with information ρ containing adjustment of a phase between polarization directions being additionally contained. For the vertical dimension, the common $W_1^v$, which is a $M \times E_v$-dimensional matrix, and the common $W_2^v$, which is a $E_v \times 1$-dimensional matrix, are fed back by performing channel measurement and estimation on all the polarized antennas. And for the horizontal dimension, the common $W_1^h$, which is a $N \times E_h$-dimensional matrix, and the common $W_2^h$, which is a $E_h \times 1$-dimensional matrix, are fed back based on measurement of different polarized antennas.

The fed back ρ is used for alignment of the phase between the different polarization directions, a value of which being selected as, for example, $\rho \in \{1, -1, j, -j\}$. After obtaining the fed back dual codebook information, the base station obtains a complete precoding matrix in vertically polarized (or +45° polarized) antennas according to $W_{V-pol} = g(W_1^v W_2^v, W_1^h W_2^h)$, and a precoding matrix in horizontally polarized (or −45° polarized) antennas is obtained through calculation by using $W_{H-pol} = g(W_1^v W_2^v, W_1^h W_2^h) \cdot \rho$.

It can be seen from the above embodiment that the UE respectively feeds back the CSI corresponding to the vertical dimension and the CSI corresponding to the horizontal dimension, and the overhead for performing feedback of CSI may be further reduced.

Embodiment 3

An embodiment of the present disclosure provides a method for feeding back CSI, applicable to an MIMO system using a 2D antenna array including a vertical dimension and a horizontal dimension. This method shall be described in this embodiment from a base station side, with contents identical to those in Embodiment 1 being not going to be described any further.

Figure 10:
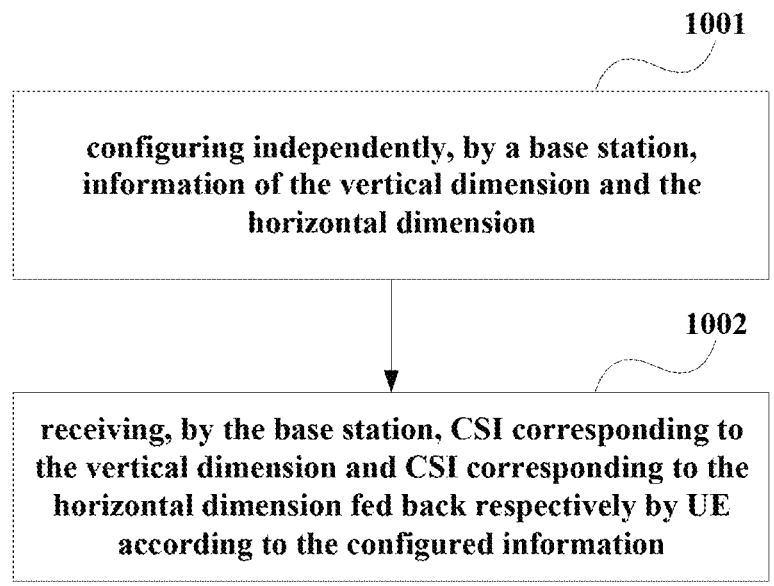
FIG. 10 is a flowchart of a method for feeding back of Embodiment 3 of the present disclosure.

FIG. 10 is a flowchart of the method for feeding back of the embodiment of the present disclosure. As shown in FIG. 10, the method includes:

step 1001: configuring independently, by a base station, information of the vertical dimension and the horizontal dimension;

in particular implementation, the information may include a feedback period and offset of the CSI; however, the present disclosure is not limited thereto, and particular information may be determined according to an actual situation;

step 1002: receiving, by the base station, CSI corresponding to the vertical dimension and CSI corresponding to the horizontal dimension fed back respectively by UE according to the configured information.

In an implementation, the feedback period of the CSI of the vertical dimension may be different from the feedback period of the CSI of the horizontal dimension; for example, the feedback period of the CSI of the vertical dimension may be longer than the feedback period of the CSI of the horizontal dimension.

In another implementation, the feedback offset of the CSI of the vertical dimension may be different from the feedback offset of the CSI of the horizontal dimension; for example, the feedback offset of the PMI of the vertical dimension may be different from the feedback offset of the PMI of the horizontal dimension.

In a further implementation, a spatial domain oversampling coefficient of DFT vectors for quantizing the vertical dimension in a codebook used by the base station and UE may be less than or equal to an oversampling coefficient of the horizontal dimension.

In still another implementation, the number of the DFT vectors for quantizing the vertical dimension in the codebook used by the base station and UE may be less than the length of the DFT vectors.

It can be seen from the above embodiment that the base station configures independently the feedback periods and offsets of the CSI of the vertical dimension and the horizontal dimension, so that the UE respectively feeds back the CSI corresponding to the vertical dimension and the CSI corresponding to the horizontal dimension, which may further reduce the overhead for performing feedback of CSI.

Embodiment 4

On the basis of Embodiment 3, this embodiment describes a dual codebook in detail, with contents identical to those in Embodiment 3 being not going to be described any further.

Figure 11:
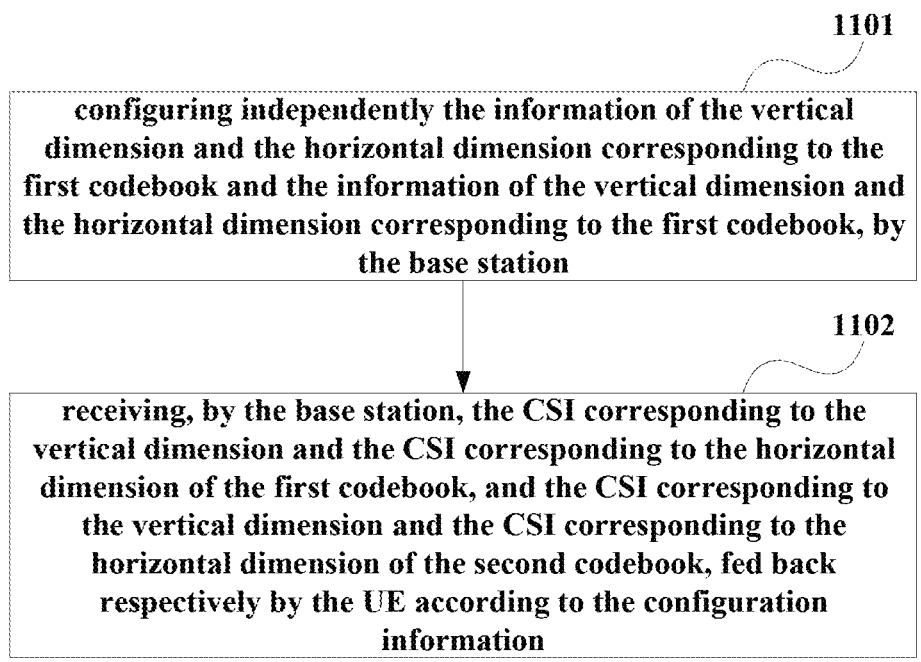
FIG. 11 is a flowchart of a method for feeding back of Embodiment 4 of the present disclosure.

FIG. 11 is a flowchart of the method for feeding back of the embodiment of the present disclosure. As shown in FIG. 11, the method includes:

step 1101: configuring independently the information of the vertical dimension and the horizontal dimension corresponding to the first codebook and the information of the vertical dimension and the horizontal dimension corresponding to the first codebook;

wherein the information may include a feedback period and a feedback offset of the CSI; however, the present disclosure is not limited thereto;

step 1102: receiving, by the base station, the CSI corresponding to the vertical dimension and the CSI corresponding to the horizontal dimension of the first codebook, and the CSI corresponding to the vertical dimension and the CSI corresponding to the horizontal dimension of the second codebook, fed back respectively by the UE according to the configuration information.

In an implementation, for the first codebook, a feedback period of the CSI of the vertical dimension is different from a feedback period of the CSI of the horizontal dimension; or for the second codebook, a feedback period of the CSI of the vertical dimension is different from a feedback period of the CSI of the horizontal dimension.

For example, for the first codebook, the feedback period of the CSI of the vertical dimension is longer than the feedback period of the CSI of the horizontal dimension; or for the second codebook, the feedback period of the CSI of the vertical dimension is longer than the feedback period of the CSI of the horizontal dimension.

In another implementation, for the first codebook, a feedback offset of the CSI of the vertical dimension is different from a feedback offset of the CSI of the horizontal dimension; or for the second codebook, a feedback offset of the CSI of the vertical dimension is different from a feedback offset of the CSI of the horizontal dimension.

In a further implementation, the 2D antenna array may be configured with dual-polarized antennas, and the method may further include: receiving, by the base station, information containing adjustment of a phase between polarization directions fed back by the UE.

It can be seen from the above embodiment that the base station configures independently the feedback periods and offsets of the CSI of the vertical dimension and the horizontal dimension, so that the UE respectively feeds back the CSI corresponding to the vertical dimension and the CSI corresponding to the horizontal dimension, which may further reduce the overhead for performing feedback of CSI.

Embodiment 5

An embodiment of the present disclosure provides UE, applicable to an MIMO system using a 2D antenna array including a vertical dimension and a horizontal dimension. This embodiment corresponds to the method for feeding back of Embodiment 1 or 2, with contents identical to those in Embodiment 1 or 2 being not going to be described any further.

Figure 12:
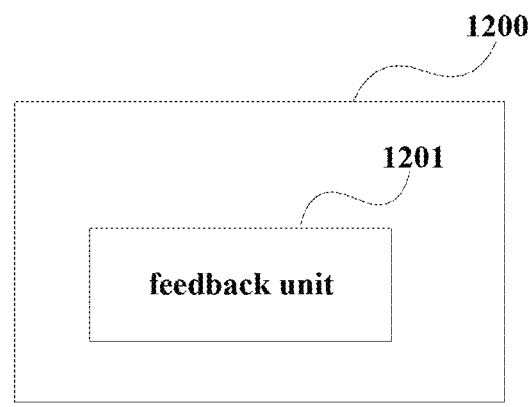
FIG. 12 is a schematic diagram of a structure of UE of Embodiment 5 of the present disclosure.

FIG. 12 is a schematic diagram of a structure of the UE of the embodiment of the present disclosure. As shown in FIG. 12, the UE 1200 includes: a feedback unit 1201. The relevant art may be referred to for other parts of the UE 1200;

wherein, the feedback unit 1201 is configured to feed back respectively CSI corresponding to the vertical dimension and CSI corresponding to the horizontal dimension.

In this embodiment, the UE 1200 may use a single codebook for feedback, and may also use a dual codebook for feedback.

In an implementation, the UE may use a dual codebook including a first codebook and a second codebook to perform feedback, and the feedback unit 1201 feeds back respectively CSI corresponding to the vertical dimension and CSI corresponding to the horizontal dimension of the first codebook, and feeds back respectively CSI corresponding to the vertical dimension and CSI corresponding to the horizontal dimension of the second codebook.

It can be seen from the above embodiment that the UE respectively feeds back the CSI corresponding to the vertical dimension and the CSI corresponding to the horizontal dimension, which may further reduce the overhead for performing feedback of CSI.

Embodiment 6

An embodiment of the present disclosure provides a base station, applicable to an MIMO system using a 2D antenna array including a vertical dimension and a horizontal dimension. This embodiment corresponds to the method for feeding back of Embodiment 3 or 4, with contents identical to those in Embodiment 3 or 4 being not going to be described any further.

Figure 13:
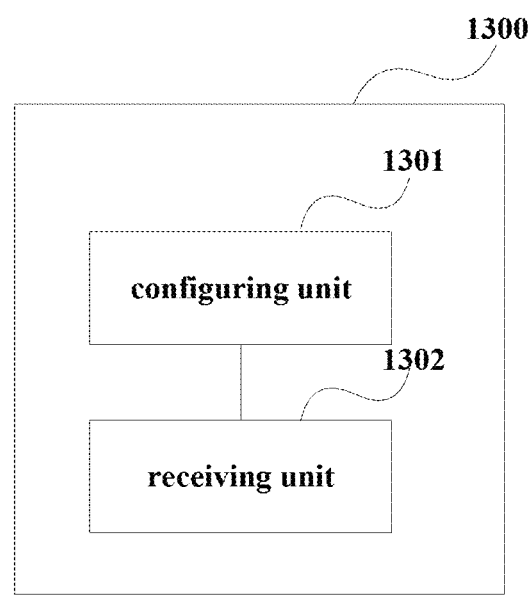
FIG. 13 is a schematic diagram of a structure of a base station of Embodiment 6 of the present disclosure.

FIG. 13 is a schematic diagram of a structure of the base station of the embodiment of the present disclosure. As shown in FIG. 13, the base station 1300 includes: a configuring unit 1301 and a receiving unit 1302. The relevant art may be referred to for other parts of the base station 1300;

wherein, the configuring unit 1301 is configured to configure independently information of the vertical dimension and the horizontal dimension (such as a feedback period and a feedback offset of CSI), and the receiving unit 1302 is configured to receive CSI corresponding to the vertical dimension and CSI corresponding to the horizontal dimension fed back respectively by UE according to the configured information.

In this embodiment, the UE may use a single codebook for feedback, and may also use a dual codebook for feedback.

In an implementation, the UE may use a dual codebook including a first codebook and a second codebook to perform feedback, and the configuring unit 1301 independently configures the information of the vertical dimension and the horizontal dimension corresponding to the first codebook and the information of the vertical dimension and the horizontal dimension corresponding to the first codebook (for example, the information may include a feedback period and a feedback offset of CSI). And the receiving unit 1302 receives CSI corresponding to the vertical dimension of the first codebook and CSI corresponding to the horizontal dimension of the first codebook, and CSI corresponding to the vertical dimension of the second codebook and CSI corresponding to the horizontal dimension of the second codebook, fed back respectively by the UE according to the configured information.

It can be seen from the above embodiment that the base station configures independently the feedback periods and offsets of the CSI of the vertical dimension and the horizontal dimension, so that the UE respectively feeds back the CSI corresponding to the vertical dimension and the CSI corresponding to the horizontal dimension, which may further reduce the overhead for performing feedback of CSI.

Embodiment 7

An embodiment of the present disclosure provides a method for transmitting CSI-RS, applicable to an MIMO system using a 2D antenna array. This method for transmitting shall be described in this embodiment from a base station side.

FIG. 14 is a flowchart of the method for transmitting of the embodiment of the present disclosure. As shown in FIG. 14, the method includes:

step 1401: transmitting, by a base station, a CSI-RS by using any row of antenna array elements and any column of antenna array elements in the 2D antenna array.

In this embodiment, the contents in Embodiment 1 are referred to. It can be seen from the matrix form in Equation (1) that an ideal rectangular array response has a characteristic as follows: any two row vectors differ from each other by only a constant coefficient, and hence, all the row vectors have the same direction; likewise, all the column vectors have the same direction. Therefore, all the array responses may be recovered by obtaining respective vector information of one row and one column only, and hence obtaining a precoding matrix matched with a channel. As a complete rectangular array response may be uniquely determined by any vertical dimension array element response and any horizontal dimension array element response, such a feature may be used to reduce CSI-RS overhead.

In an implementation, in time domain, the base station may use any row of antenna array elements and any column of antenna array elements in the 2D antenna array to transmit the CSI-RS within a subframe. In particular implement, the base station may further use another row of antenna array elements and another column of antenna array elements in the 2D antenna array to transmit the CSI-RS within another subframe.

FIG. 15 is a schematic diagram of an example of CSI-RS transmission of the embodiment of the present disclosure. As shown in FIG. 15, in a subframe, the CSI-RS may be transmitted by only one row and one column of antennas, thereby reducing overhead of the CSI-RS. In an ideal case, the UE may estimate and feed back the PMIs of the vertical dimension and the horizontal dimension based on a pattern of the CSI-RS.

In particular implementation, the CSI-RS transmission of one row and one column may be distributed in different subframes in time domain. In order to improve accuracy of CSI-RS estimation, in transmitting the CSI-RS, the base station may perform the pattern transform illustrated in FIG. 15 between the subframes, such as using another row and column of antenna array elements in a subframe j to transmit the CSI-RS, so as to provide an antenna selectivity gain. Furthermore, the UE may use CSI-RSs of multiple subframes to jointly perform PMI selection, thereby improving accuracy of PMI selection.

In another implementation, in frequency domain, the base station may use any row of antenna array elements and any column of antenna array elements in the 2D antenna array to transmit the CSI-RS within a group of physical resource block pairs (PRB pairs). In particular implementation, the base station may further use another row of antenna array elements and another column of antenna array elements in the 2D antenna array to transmit the CSI-RS within another group of PRB pairs.

In particular implementation, likewise, the CSI-RS transmission of one row and one column may be distributed in different PRB pairs in frequency domain. As only one row and one column of CSI-RSs are transmitted in each of the PRB pairs, the goal of reducing CSI-RS overhead may also be achieved.

It can be seen from the above embodiment that the base station uses any row of antenna array elements and any column of antenna array elements in the 2D antenna array to transmit the CSI-RS, which may further reduce the overhead for transmitting CSI-RS.

Embodiment 8

An embodiment of the present disclosure provides a method for transmitting CSI-RS, applicable to an MIMO system using a 2D antenna array. This method for transmitting shall be described in this embodiment from a UE side.

FIG. 16 is a flowchart of the method for transmitting of the embodiment of the present disclosure. As shown in FIG. 16, the method includes:

step 1601: receiving, by UE, a CSI-RS transmitted by a base station, the CSI-RS being transmitted by the base station by using any row of antenna array elements and any column of antenna array elements in the 2D antenna array.

In particular implementation, the transmission may be performed in time domain, and may also be performed in frequency domain. The CSI-RS transmission of one row and one column may be distributed in different subframes in the time domain, and the CSI-RS transmission of one row and one column may also be distributed in different PRB pairs in the frequency domain.

Figure 17:
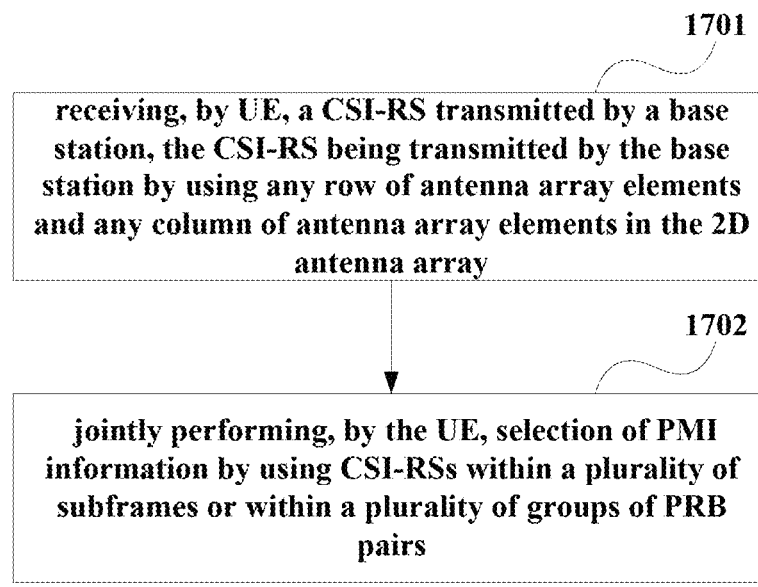
FIG. 17 is another flowchart of the method for transmitting of Embodiment 8 of the present disclosure.

FIG. 17 is another flowchart of the method for transmitting of the embodiment of the present disclosure. As shown in FIG. 17, the method includes:

step 1701: receiving, by UE, a CSI-RS transmitted by a base station, the CSI-RS being transmitted by the base station by using any row of antenna array elements and any column of antenna array elements in the 2D antenna array; and step 1702: using, by the UE, CSI-RSs within a plurality of subframes or within a plurality of groups of PRB pairs to jointly perform selection of PMI information.

It can be seen from the above embodiment that the UE receives the CSI-RSs transmitted by the base station by using any row of antenna array elements and any column of antenna array elements in the 2D antenna array, which may further reduce the overhead for performing feedback of CSI.

Embodiment 9

An embodiment of the present disclosure provides a base station, applicable to an MIMO system using a 2D antenna array. This embodiment corresponds to the method for transmitting of Embodiment 7, with contents identical to those in Embodiment 7 being not going to be described any further.

Figure 18:
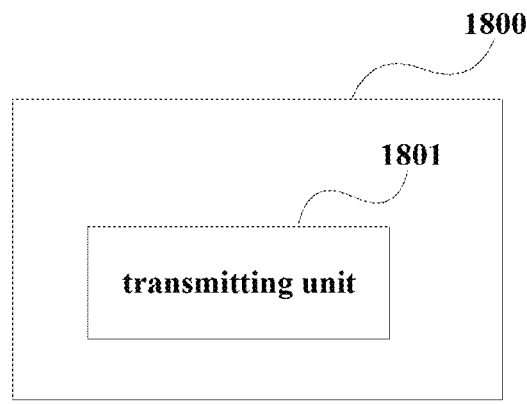
FIG. 18 is a schematic diagram of a structure of a base station of Embodiment 9 of the present disclosure.

FIG. 18 is a schematic diagram of a structure of the base station of the embodiment of the present disclosure. As shown in FIG. 18, the base station 1800 includes: a transmitting unit 1801. The relevant art may be referred to for other parts of the base station 1800;

wherein, the transmitting unit 1801 is configured to transmit a CSI-RS by using any row of antenna array elements and any column of antenna array elements in the 2D antenna array.

In an implementation, in time domain, the transmitting unit 1801 is configured to use any row of antenna array elements and any column of antenna array elements in the 2D antenna array to transmit the CSI-RS within a subframe.

In particular implementation, the transmitting unit 1801 may be further configured to use another row of antenna array elements and another column of antenna array elements in the 2D antenna array to transmit the CSI-RS within another subframe.

In another implementation, in frequency domain, the transmitting unit 1801 is configured to use any row of antenna array elements and any column of antenna array elements in the 2D antenna array to transmit the CSI-RS within a group of PRB pairs.

In particular implementation, the transmitting unit 1801 may be further configured to use another row of antenna array elements and another column of antenna array elements in the 2D antenna array to transmit the CSI-RS within another group of PRB pairs.

It can be seen from the above embodiment that the base station uses any row of antenna array elements and any column of antenna array elements in the 2D antenna array to transmit the CSI-RS, which may further reduce the overhead for transmitting CSI-RS.

Embodiment 10

An embodiment of the present disclosure provides UE, applicable to an MIMO system using a 2D antenna array. This embodiment corresponds to the method for transmitting of Embodiment 8, with contents identical to those in Embodiment 8 being not going to be described any further.

Figure 19:
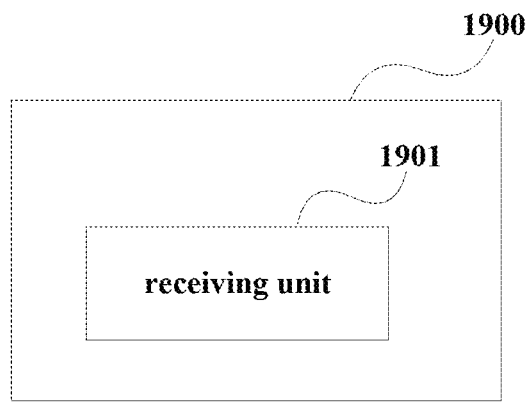
FIG. 19 is a schematic diagram of a structure of UE of Embodiment 10 of the present disclosure.

FIG. 19 is a schematic diagram of a structure of the UE of the embodiment of the present disclosure. As shown in FIG. 19, the UE 1900 includes: a receiving unit 1901. The relevant art may be referred to for other parts of the UE 1900;

wherein, the receiving unit 1901 is configured to receive a CSI-RS transmitted by a base station, the CSI-RS being transmitted by the base station by using any row of antenna array elements and any column of antenna array elements in the 2D antenna array.

Figure 20:
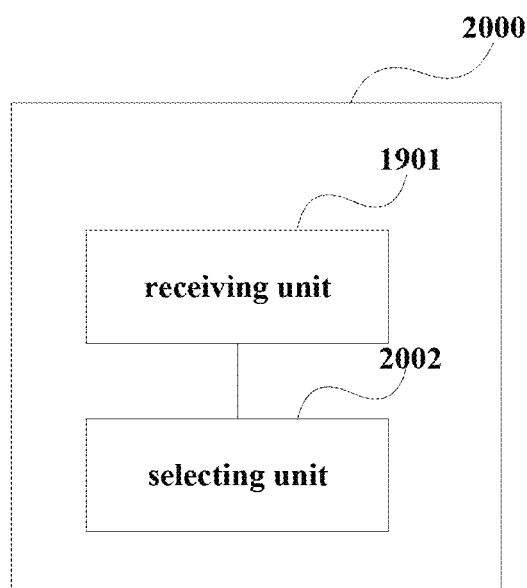
FIG. 20 is another schematic diagram of the structure of the UE of Embodiment 10 of the present disclosure.

FIG. 20 is another schematic diagram of the structure of the UE of the embodiment of the present disclosure. As shown in FIG. 20, the UE 2000 includes: a receiving unit 1901, as described above.

As shown in FIG. 20, the UE 2000 may further include: a selecting unit 2002 configured to use a CSI-RS within a plurality of subframes or within a plurality of groups of PRB pairs to jointly perform selection of precoding matrix indication information.

It can be seen from the above embodiment that the UE receives the CSI-RS transmitted by the base station by using any row of antenna array elements and any column of antenna array elements in the 2D antenna array, which may further reduce the overhead for transmitting CSI-RS.

Embodiment 11

An embodiment of the present disclosure provides a communication system, which is an MIMO system using a 2D antenna array.

Figure 21:
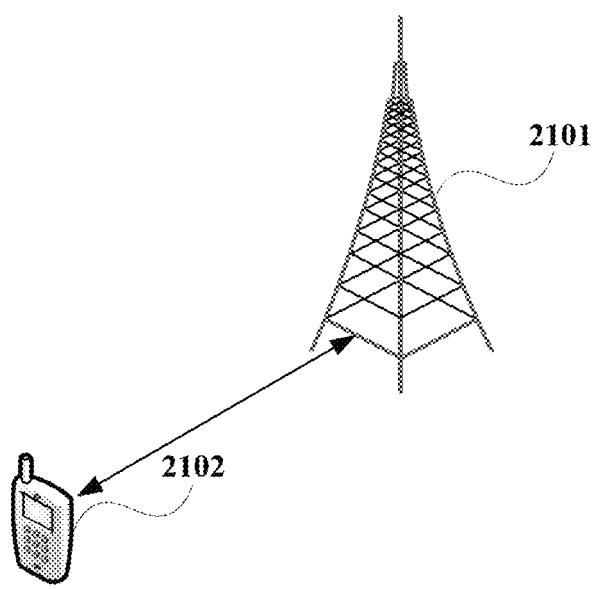
FIG. 21 is a schematic diagram of a structure of a communication system of Embodiment 11 of the present disclosure.

FIG. 21 is a schematic diagram of the structure of the communication system of the embodiment of the present disclosure. As shown in FIG. 21, the communication system 2100 includes: a base station 2101 and UE 2102.

In an implementation, the base station 2101 may be as described in Embodiment 6, and the UE 2102 may be as described in Embodiment 5. In another implementation, the base station 2101 may be as described in Embodiment 9, and the UE 2102 may be as described in Embodiment 10.

Embodiments 1-10 may be referred to for other contents of the communication system. It should be noted that FIG. 21 only schematically shows the structure of the communication system. However, the present disclosure is not limited thereto, and a particular implementation may be determined according to an actual situation.

An embodiment of the present disclosure provides a computer-readable program, wherein when the program is executed in a base station, the program enables a computer to carry out the method for feeding back CSI as described in Embodiment 3 or 4, or the method for transmitting CSI-RS as described in Embodiment 7, in the base station.

An embodiment of the present disclosure provides a storage medium in which a computer-readable program is stored, wherein the computer-readable program enables a computer to carry out the method for feeding back CSI as described in Embodiment 3 or 4, or the method for transmitting CSI-RS as described in Embodiment 7, in a base station.

An embodiment of the present disclosure provides a computer-readable program, wherein when the program is executed in UE, the program enables a computer to carry out the method for feeding back CSI as described in Embodiment 1 or 2, or the method for transmitting CSI-RS as described in Embodiment 8, in the UE.

An embodiment of the present disclosure provides a storage medium in which a computer-readable program is stored, wherein the computer-readable program enables a computer to carry out the method for feeding back CSI as described in Embodiment 1 or 2, or the method for transmitting CSI-RS as described in Embodiment 8, in UE.

The above devices and methods of the present disclosure may be implemented by hardware, and may also be implemented by hardware in combination with software. The present disclosure relates to such a computer-readable program that when the program is executed by a logic component, it enables the logic component to implement the devices or constitutional parts as described above, or enables the logic component to implement the methods or steps as described above. The present disclosure relates also to a storage medium for storing the above program, such as a hard disk, a floppy disk, a CD, and flash memory, etc.

One or more functional blocks and/or one or more combinations of the functional blocks in Figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure are described above in conjunction with the embodiments, however, it will be apparent to those skilled in the art that such description is exemplary only and is not limitative to the protection scope of the present disclosure. Various variations and modifications may be made by those skilled in the art without departing from the principle of the present disclosure, which will fall within the protection scope of the present disclosure.

What is claimed is:

1. A User Equipment (UE), configured in an MIMO system using a 2D antenna array comprising a vertical dimension and a horizontal dimension, the UE comprising:
   a feedback unit configured to feed back respectively CSI corresponding to the vertical dimension and CSI corresponding to the horizontal dimension,
   wherein a feedback period of the CSI of the vertical dimension is different from a feedback period of the CSI of the horizontal dimension, or a feedback offset of the CSI of the vertical dimension is different from a feedback offset of the CSI of the horizontal dimension.

2. The UE according to claim 1, wherein in a codebook, a spatial domain oversampling coefficient of discrete Fourier transform vectors for quantizing the vertical dimension is less than or equal to a spatial domain oversampling coefficient of discrete Fourier transform vectors for quantizing the horizontal dimension.

3. The UE according to claim 1, wherein a number of discrete Fourier transform vectors for quantizing the vertical dimension in a codebook is less than a length of the discrete Fourier transform vectors.

4. The UE according to claim 1, wherein the UE performs feedback by using a dual codebook comprising a first codebook and a second codebook;
   and the feedback unit is configured to feed back respectively CSI corresponding to the vertical dimension and CSI corresponding to the horizontal dimension of the first codebook, and feeds back respectively CSI corresponding to the vertical dimension and CSI corresponding to the horizontal dimension of the second codebook.

5. The UE according to claim 4, wherein for the first codebook or the second codebook, a feedback period of the CSI of the vertical dimension is different from a feedback period of the CSI of the horizontal dimension.

6. The UE according to claim 4, wherein for the first codebook or the second codebook, a feedback offset of the CSI of the vertical dimension is different from a feedback offset of the CSI of the horizontal dimension.

7. The UE according to claim 4, wherein the 2D antenna array is configured with dual-polarized antennas;
   and the feedback unit is configured to feed back information containing adjustment of a phase between polarization directions.

8. A base station, configured in an MIMO system using a 2D antenna array comprising a vertical dimension and a horizontal dimension, the base station comprising:
   a configuring unit configured to configure independently information of the vertical dimension and the horizontal dimension; and
   a receiving unit configured to receive CSI corresponding to the vertical dimension and CSI corresponding to the horizontal dimension fed back respectively by UE according to the configured information,
   wherein a feedback period of the CSI of the vertical dimension is different from a feedback period of the CSI of the horizontal dimension, or a feedback offset of the CSI of the vertical dimension is different from a feedback offset of the CSI of the horizontal dimension.

9. The base station according to claim 8, wherein the UE performs feedback by using a dual codebook comprising a first codebook and a second codebook;
and the configuring unit is configured to independently configure the information of the vertical dimension and the horizontal dimension corresponding to the first codebook and the information of the vertical dimension and the horizontal dimension corresponding to the first codebook.

10. A base station, configured in an MIMO system using a 2D antenna array, the base station comprising:
a transmitting unit configured to transmit a CSI-RS by using any row of antenna array elements and any column of antenna array elements in the 2D antenna array,
wherein in time domain, the transmitting unit is configured to transmit the CSI-RS within a subframe by using any row of antenna array elements and any column of antenna array elements in the 2D antenna array, and to transmit the CSI-RS within another subframe by using another row of antenna array elements and another column of antenna array elements in the 2D antenna array, or
wherein in frequency domain, the transmitting unit is configured to transmit the CSI-RS within a group of physical resource block pairs by using any row of antenna array elements and any column of antenna array elements in the 2D antenna array, and to transmit the CSI-RS within another group of physical resource block pairs by using another row of antenna array elements and another column of antenna array elements in the 2D antenna array.

11. A User Equipment (UE), configured in an MIMO system using a 2D antenna array, the UE comprising:
a receiving unit configured to receive a CSI-RS transmitted by a base station, the CSI-RS being transmitted by the base station by using any row of antenna array elements and any column of antenna array elements in the 2D antenna array,
wherein in time domain, the base station is configured to transmit the CSI-RS within a subframe by using any row of antenna array elements and any column of antenna array elements in the 2D antenna array, and to transmit the CSI-RS within another subframe by using another row of antenna array elements and another column of antenna array elements in the 2D antenna array, or
wherein in frequency domain, the base station is configured to transmit the CSI-RS within a group of physical resource block pairs by using any row of antenna array elements and any column of antenna array elements in the 2D antenna array, and to transmit the CSI-RS within another group of physical resource block pairs by using another row of antenna array elements and another column of antenna array elements in the 2D antenna array.

12. The UE according to claim 11, wherein the UE further comprises:
a selecting unit configured to jointly perform selection of precoding matrix indication information by using a CSI-RS within a plurality of subframes or within a plurality of groups of physical resource block pairs.

13. A communication system, comprising:
a User Equipment (UE), configured to feed back respectively CSI corresponding to a vertical dimension and CSI corresponding to a horizontal dimension;
a base station, configured to configure independently information of the vertical dimension and the horizontal dimension; and
receive CSI corresponding to the vertical dimension and CSI corresponding to the horizontal dimension fed back respectively by the UE,
wherein a feedback period of the CSI of the vertical dimension is different from a feedback period of the CSI of the horizontal dimension, or a feedback offset of the CSI of the vertical dimension is different from a feedback offset of the CSI of the horizontal dimension.

14. A communication system, comprising:
a base station, configured to transmit a CSI-RS by using any row of antenna array elements and any column of antenna array elements in a 2D antenna array;
a User Equipment (UE), configured to receive the CSI-RS transmitted by the base station,
wherein in time domain, the base station is configured to transmit the CSI-RS within a subframe by using any row of antenna array elements and any column of antenna array elements in the 2D antenna array, and to transmit the CSI-RS within another subframe by using another row of antenna array elements and another column of antenna array elements in the 2D antenna array,
or wherein in frequency domain, the base station is configured to transmit the CSI-RS within a group of physical resource block pairs by using any row of antenna array elements and any column of antenna array elements in the 2D antenna array, and to transmit the CSI-RS within another group of physical resource block pairs by using another row of antenna array elements and another column of antenna array elements in the 2D antenna array.

* * * * *